United States Patent
Etemad et al.

(10) Patent No.: US 8,290,371 B2
(45) Date of Patent: *Oct. 16, 2012

(54) OCDM-BASED ALL OPTICAL MULTI-LEVEL SECURITY

(75) Inventors: Shahab Etemad, Warren, NJ (US); Janet Jackel, Holmdel, NJ (US); Sarry Habiby, Middletown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 523 days.

This patent is subject to a terminal disclaimer.

(21) Appl. No.: 12/563,706

(22) Filed: Sep. 21, 2009

(65) Prior Publication Data

US 2010/0091990 A1    Apr. 15, 2010

Related U.S. Application Data

(60) Provisional application No. 61/098,418, filed on Sep. 19, 2008.

(51) Int. Cl.
  *H04J 14/02* (2006.01)
  *H04J 4/00* (2006.01)
  *H04K 1/00* (2006.01)
(52) U.S. Cl. .............. 398/79; 398/77; 380/256
(58) Field of Classification Search .......... 380/255–256; 398/77

See application file for complete search history.

(56) References Cited

U.S. PATENT DOCUMENTS

| | | | | |
|---|---|---|---|---|
| 5,856,971 A * | 1/1999 | Gitlin et al. | .................... | 370/335 |
| 6,359,868 B1 * | 3/2002 | Chen et al. | .................... | 370/335 |
| 6,373,831 B1 * | 4/2002 | Secord et al. | .................. | 370/342 |
| 7,200,342 B2 * | 4/2007 | Dafesh | ........................... | 398/182 |
| 7,555,216 B2 * | 6/2009 | Yoshino et al. | .................. | 398/77 |
| 2003/0175034 A1 * | 9/2003 | Noe | .............................. | 398/152 |
| 2004/0208233 A1 * | 10/2004 | Dafesh | ........................... | 375/147 |
| 2004/0208602 A1 * | 10/2004 | Plante | ............................ | 398/140 |
| 2004/0208604 A1 * | 10/2004 | Madsen | ........................ | 398/147 |
| 2005/0233710 A1 * | 10/2005 | Lakkis et al. | .................. | 455/102 |
| 2006/0147219 A1 * | 7/2006 | Yoshino et al. | ................ | 398/183 |
| 2008/0130887 A1 * | 6/2008 | Harvey et al. | ................. | 380/256 |
| 2010/0091990 A1 * | 4/2010 | Etemad et al. | ................ | 380/256 |
| 2010/0183309 A1 * | 7/2010 | Etemad et al. | .................. | 398/79 |

OTHER PUBLICATIONS

Shahab Etemad et al. "Etemad" (S. Etemad; A. Agarwal; T. Banwell; J. Jackel; R. Menendez; and P. Toliver; "OCDM-based photonic layer "security" scalable to 100 Gbits/s for existing WDM networks", vol. 6, No. 7 / Jul. 2007 / Journal of Optical Networking).*

* cited by examiner

*Primary Examiner* — Kenneth N Vanderpuye
*Assistant Examiner* — Abbas H Alagheband
(74) *Attorney, Agent, or Firm* — Philip J. Feig

(57) ABSTRACT

A high data rate optical signal is inverse multiplexed into a multitude of lower-rate tributaries, each of which is coded by its unique OCDM code, and the combined coded tributaries are injected into a common phase scrambler. Coherent summation of these optically encoded tributaries pass through a shared phase or phase and frequency scrambler before exiting the secure location. The setting of the scrambler acts as the key. The authorized recipient with the correct key retrieves the ones and zeros of the several decoded signals.

10 Claims, 9 Drawing Sheets

OCDM-BASED ALL OPTICAL MULTI-LEVEL SECURITY

CROSS-REFERENCE TO RELATED APPLICATIONS

This application claims the benefit of the filing date of U.S. Provisional Application No. 61/098,418, filed on Sep. 19, 2008, the disclosures of which are incorporated herein by reference.

STATEMENT REGARDING FEDERALLY SPONSORED RESEARCH OR DEVELOPMENT

Funding for research was made with Government support under MDA972-O3-C-0078 awarded by the Defense Advanced Research Projects Agency (DARPA). The Government has certain rights in this invention.

BACKGROUND OF THE INVENTION

1. Field of the Invention

The present invention relates generally to optical code division multiplexing (OCDM) systems and methodologies using passive integrated phase coders for multi-level security (MLS) in existing wavelength division multiplexing (WDM) networks.

2. Description of the Related Art

Faced with the demand for high capacity communication, there is growing interest in deploying WDM fiber optic networks. For many applications, for example in avionics, an optical physical layer that can support multi-level security is needed. Using different fibers (space division multiplexing) is an obvious choice, but is costly because it requires additional fiber infrastructure. In wavelength division multiplexing networks, different security levels are carried on the same fiber, but on different optical channels. However, concerns remain regarding wavelength division multiplexing enabled multi-level security being susceptible to eavesdropping through inter-window cross talk as well as through more conventional means of eavesdropping.

Conventional optical eavesdropping can include, for example, physical tapping of the fiber.

An example of eavesdropping via crosstalk is described below.

In a dense wavelength division multiplex (DWDM) system, each of several input signals enter a DWDM node or network element and is assigned or converted to a specific wavelength, typically, in the 1550 nanometer (nm) band. After wavelength conversion, each individual signal wavelength or channel is then multiplexed by wavelength division multiplexing and transmitted onto the same fiber. Consequently, a single fiber carries more than one wavelength. In fact each wavelength carried by a DWDM system may be considered a virtual fiber.

The signal carried on the virtual fibers of DWDM systems may be susceptible to eavesdropping of a form that is not possible if the signals are on separate fibers. In DWDM systems different channels travel through the same fiber and the same components. As a result of cross-talk, nonlinearity, etc., at the receiving end, there may be a residual of signal(s) from other channels that can be isolated, amplified and detected.

The potential for eavesdropping may be better appreciated by reference to FIG. 1 where there is depicted a receiving node 100 in a DWDM network. Receiving node 100 may be an optical demultiplexer or add drop multiplexer, a wavelength converter, or an optical cross-connect that serves as a drop off or interchange point for one or more channels. FIG. 2 shows, on a logarithmic scale, the optical spectrum of channel 10 in FIG. 1 as it dropped from node 100. As FIG. 2 shows, although the goal was to drop only channel 10, channel 11 is clearly visible. In FIG. 3, a filter is used to reduce the optical signal to noise ratio (OSNR) for channel 10. As FIG. 3 shows, channel 11 is still present with enough power to be recoverable. In fact, in FIG. 4, the channel 10 transmitter has been turned off and as FIG. 4 shows there is a significant amount of residual power still present from channel 11. Results similar to those shown in FIG. 4 have also been achieved by introducing a second filter to attenuate channel 10 in the received spectrum. In either case, in FIG. 4, channel 11 is leaked with large enough OSNR to be recoverable after optical amplification. Accordingly, the user of channel 10 may be able to recover channel 11 without the network operator ever knowing of the breach in security. On another level, residual power from each channel may be available on all the channels thereby providing for security akin to having a party line.

BRIEF SUMMARY OF THE INVENTION

An aspect of the present invention is an optical system for transporting data. The optical system has a source for generating a sequence of optical pulses each optical pulse comprising a plurality of spectral lines uniformly spaced in frequency with fixed absolute frequency and relative phase; a set of data modulators each associated with a tributary/channel and operable to modulate the sequence of pulses using tributary/channel data to produce a modulated data signal; a set of encoders imparting a plurality of orthogonal codes, each of the plurality of orthogonal codes being associated with one of the data modulators to spectrally encode the modulated data signal to produce an encoded data signal; an optical combiner for bit-synchronously combining the encoded data signals into a composite transport data signal wherein each tributary/channel shares the same spectral bandwidth during transmission; a shared spectral phase scrambler for phase scrambling the composite transport data signal using a shared scramble code as an encryption key to generate the encrypted signal; a shared spectral phase descrambler for descrambling the encrypted signal using a shared descramble code as a key to generate a descrambled data signal, the shared descramble code being a compliment of the shared scramble code; and a set of decoders each of which is a conjugate match to one of the encoders, for spectrally decoding a specified encoded data signal to produce a set of decoded data signals.

Another aspect of the present invention is a method for transmitting data from a plurality of tributaries between a transmitting end and a receiving end. The method includes inverse multiplexing a high data rate optical signal into a plurality of lower-rate tributaries; encoding each of the plurality of lower-rate tributaries into a plurality of coded tributaries by applying a unique OCDM code from a set of mutually orthogonal codes; bit-synchronously combining the plurality of coded tributaries; and phase scrambling the combined coded tributaries using a shared scrambling code as an encryption key to generate an encrypted composite signal.

BRIEF DESCRIPTION OF THE DRAWINGS

These and other features, aspects and advantages of the present invention will become better understood with regard to the following descriptions, appended claims, and accompanying drawings wherein:

FIG. 10(a) is the phase scrambling diagonal matrix that is applied aggregate of all channels/codes present as a separate unit 540; in FIG. 10(b) the matrix shows combined functionality of phase scrambling in 549 and frequency shuffling that has to be applied at the position of each code 530 present before aggregating, and (c) is the monomially modified Hadamard codes that represents the phases of each frequency bin.

DETAILED DESCRIPTION OF THE INVENTION

List of Acronyms

The acronyms in the following list are applied at various locations herein. The meaning of the terms referenced by these acronyms is more completely understood from the complete description.

CDMA—code division multiple access
DWDM—dense wavelength division multiplexing
MLL—mode-locked laser
MLS—multi-level security
MCI—multi-channel interference
MRR—micro-ring resonators
OCDM—optical code division multiplex/ing
OCDMA—optical code-division multiple access
OOK—on-off-keying
OSNR—optical signal to noise ratio
PLS—photonic layer security
SPE—spectral phase encoding
WDM—wavelength division multiplexing High Level Description New techniques, including an optical code-division multiplexing (OCDM) system and methodology based on a passive spectral phase encoding (SPE) scheme that is compatible with WDM networks and offers photonic layer security (PLS) are presented.

Compatibility is achieved through the ability to access and modify optical phase of tightly spaced phase locked laser lines with high resolution. In WDM networks, different security levels are carried through different optical windows. However, as discussed above, WDM enabled MLS is susceptible to eavesdropping through inter-window cross talk as well as to more conventional tapping.

The inventive techniques offer another level of security beyond WDM by providing the proper recipient its unique OCDM code, without which inadvertently leaked or intentionally captured signals cannot be deciphered.

The inventive techniques also offer a higher level of security that is robust to both exhaustive search and archival attacks through phase scrambling of the inverse multiplexed tributaries of the high data rate aggregate signal.

System Architecture

Figure 1:
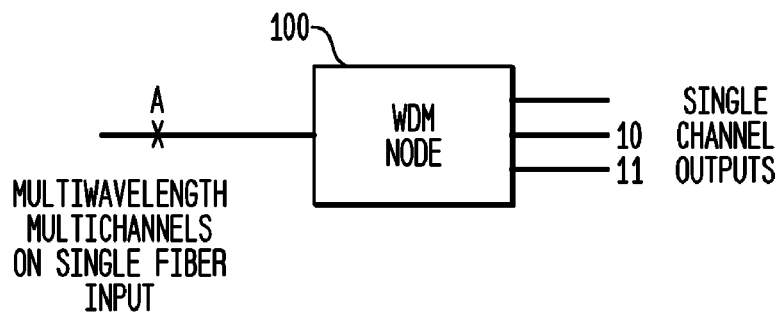
FIG. 1 illustratively depicts a receiving node in a DWDM network.
Figure 2:
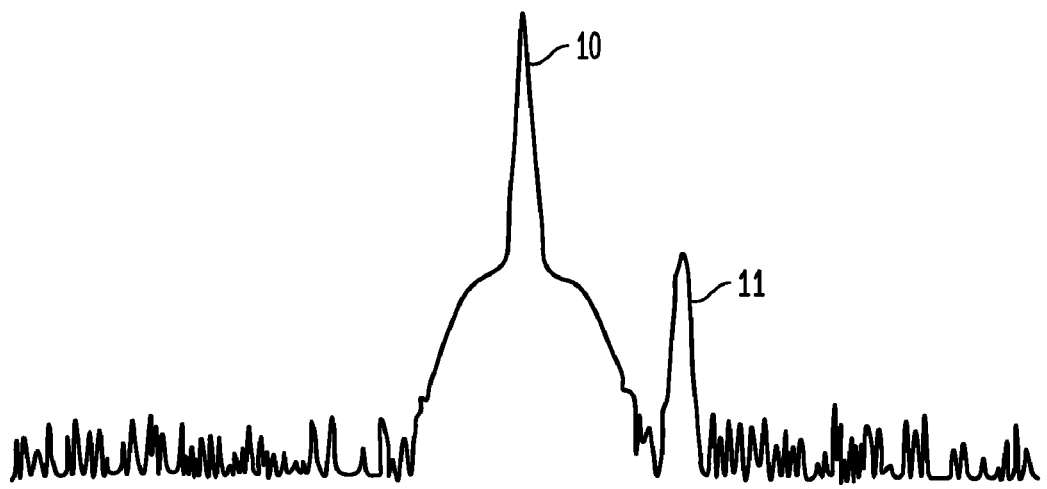
FIG. 2 is a spectral plot of a received channel that is dropped from the DWDM node of FIG. 1, channel 11 appears as cross-talk in the spectral plot of FIG. 2.
Figure 3:
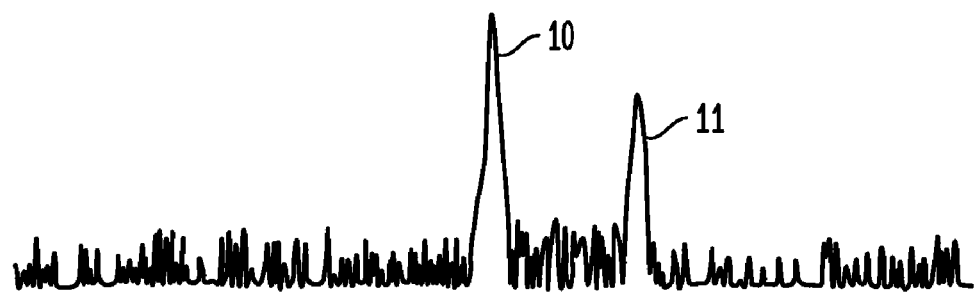
FIG. 3 is a spectral plot of the spectrum in FIG. 2 after filtering.
Figure 4:
FIG. 4 depicts the leaked channel after channel 10 in FIG. 3 is turned off or after a second filter is applied to FIG. 3.
Figure 5:
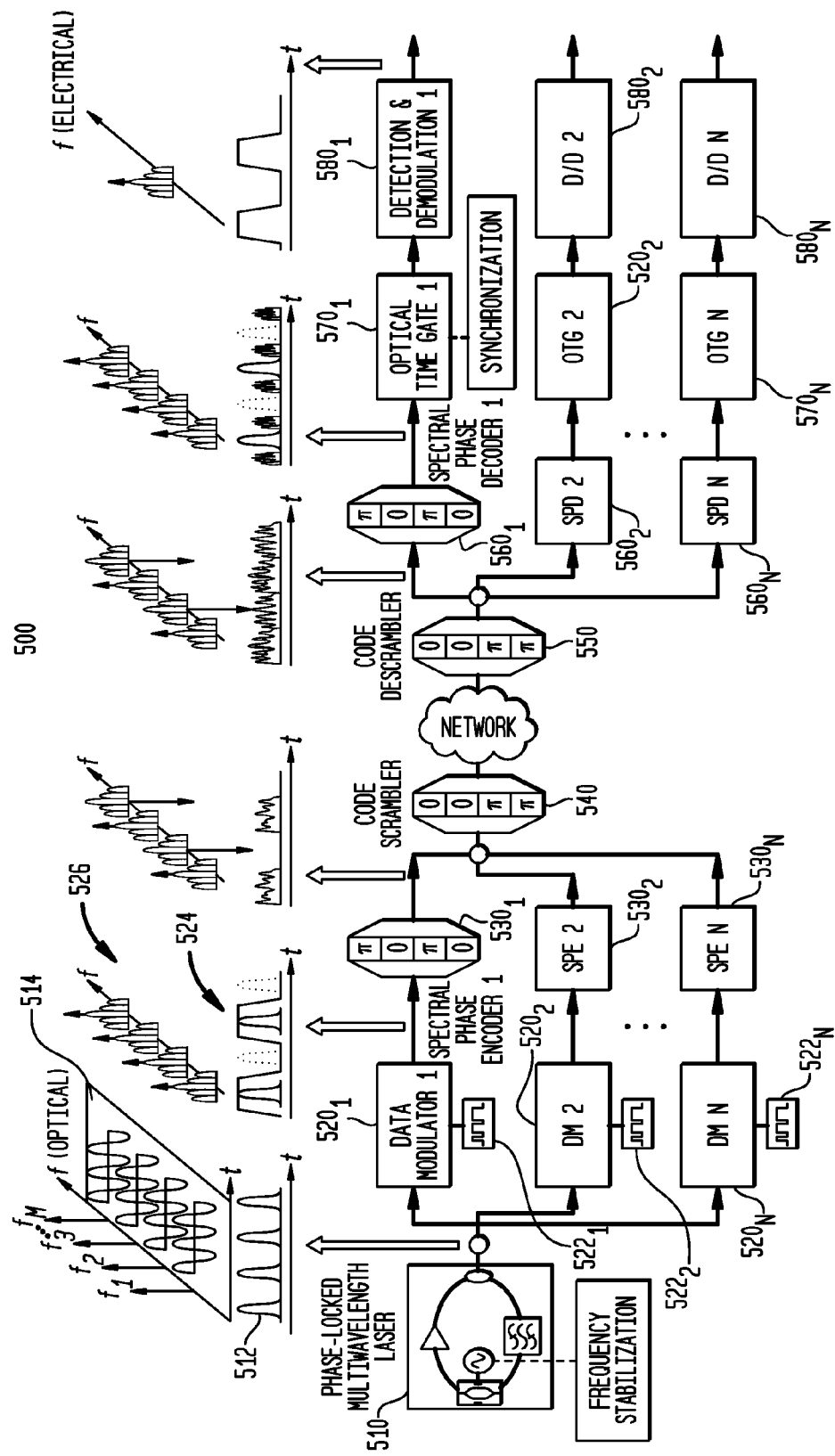
FIG. 5 illustrates the SPE-OCDM system architecture of an embodiment of the present invention. Top X-Y plots show the time-frequency response at each position identified by large vertical arrows.

FIG. 5 illustratively depicts an OCDM system 500 in accordance with an aspect of the present invention. In addition to illustrating an overall system architecture, FIG. 5 also includes a diagram that depicts signal flows through the system 500 in the time and frequency domain.

The system 500 comprises a laser source 510 that generates a sequence of optical pulses that are fed to each of data modulators $520_{1\ldots N}$. The system 500 includes N tributaries or channels that each provide data that is used to respectively modulate the sequence of optical pulses generated by laser source 510. Each of data modulators $520_{1\ldots N}$ comprises an ON/OFF keyed data modulator wherein a "1" symbol or bit in the digital data stream corresponds to the presence of an optical pulse and a "0" symbol or bit corresponds to the absence of an optical pulse. In accordance with the present invention, other modulation techniques including those based on phase can be applied. In this way, each pulse represents a bit of information. For example, in a modulated digital data stream comprising a "1010" data sequence, each time slot with the bit "1" will result in the presence of an optical pulse whereas each time slot with a "0" bit indicates the absence of an optical pulse.

Each modulated data stream is then fed to a corresponding one of spectral phase encoders $530_{1\ldots N}$. As is discussed in further detail below, each of the spectral phase encoders $530_{1\ldots N}$ uses a phase mask to apply a phase code associated with a tributary or channel to each optical pulse in the data stream to produce an encoded data stream. The phase code operates to provide a "lock" so that only a corresponding phase decoder with the appropriate "key" or phase conjugate of the phase code of the spectral phase encoder may unlock the encoded data stream. Typically, a spectral phase encoder is associated with a particular tributary or channel and therefore allows only another tributary or channel with the appropriate key to decode or receive information from the particular tributary or channel The information appears as noise to tributaries or channels that do not have the appropriate key.

After a modulated data stream is encoded, the encoded data stream can be passively combined with other encoded data streams with bit-time synchronization, each of which have their own unique spectral phase codes but overlap completely in the frequency domain. This form of passive multiplexing distinguishes optical CDMA from dense wavelength division multiplexing (DWDM) systems where tributaries or channels are assigned independent, non-overlapping spectral passbands.

The combined encoded data streams then pass through a phase scrambler 540 which changes the phase of the aggregate signal within each frequency bin relative to other frequency bins using a random key shared with the receiving end. The scrambled data stream may then be transported over a network, such as a WDM network, to the receiving end where a descrambler 550, using the shared random key, undoes the scrambling.

Figure 10:
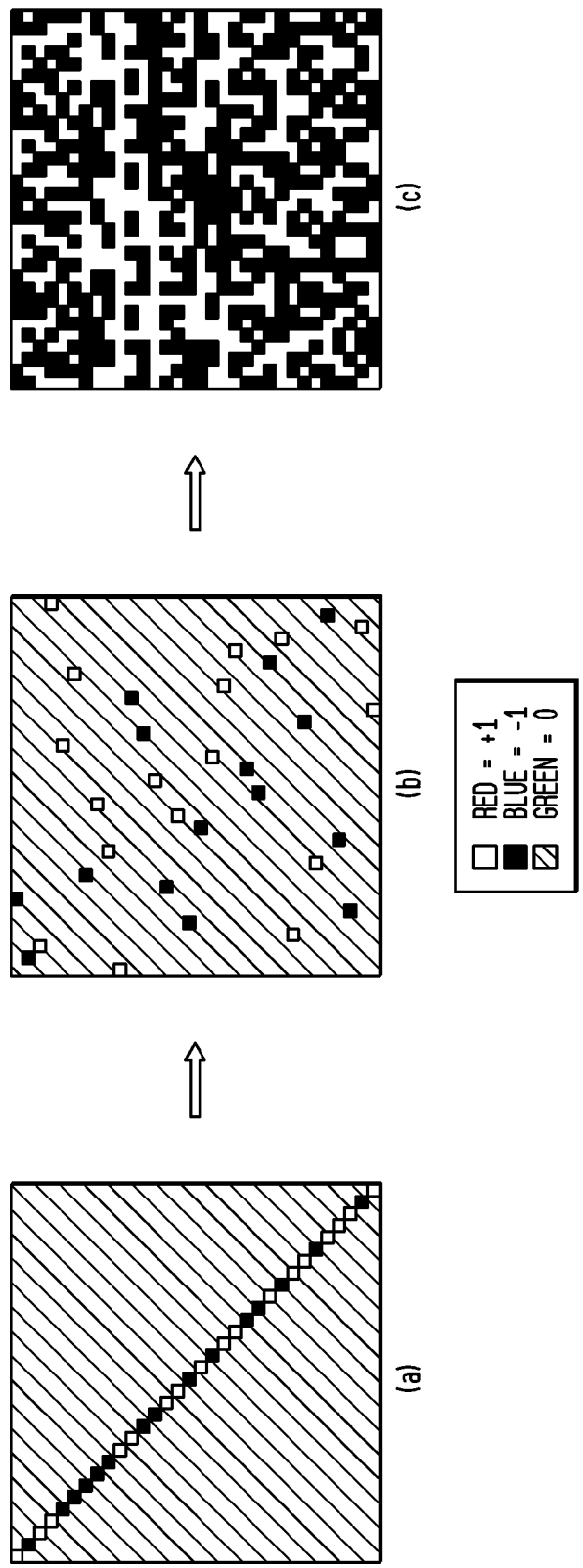
FIG. 10 shows the progression of increased security by doing frequency shuffling in addition to shared phase scrambling by using monomial matrix and the methodology to implement it. Specifically.

Scrambling the phase of aggregate signals can also be achieved by combining the spectral phase encoder 530 and the phase scrambler 540 in a single unit. This results in the use of one less coder/scrambler unit. But the more important use of this procedure enables frequency shuffling in addition to aggregate phase scrambling using monomial matrix, as illustrated in FIG. 10, instead of a diagonal matrix.

The descrambled data stream is then fed to a spectral phase decoder 560 that, preferably, includes a phase mask that applies the phase conjugate of the phase code of the spectral phase encoder 530, as discussed above. The spectral phase decoder 530 provides a decoded data stream to an optical time gate 570. As is discussed in detail below, the optical time gate 570 operates to reduce multiple access interference by temporally extracting only a desired tributary from among the decoded stream. The optical time gate 570 produces a data stream, which is fed to a data demodulator 580. Where ON/OFF keying was employed at the transmitting end, the data demodulator 580 comprises an amplitude detector that reproduces the digital data stream.

Implementation of the above described system is discussed in further detail below.

Implementation of SPE-OCDM

U.S. patent application Ser. No. 11/062,090 describes a wavelength-division multiplexing-compatible spectral phase encoding approach to OCDM, the contents of which are incorporated by reference in the present application.

In accordance with an aspect of the present invention, the laser source 510 comprising a mode locked laser (MLL) having a spectral content comprising a stable comb of closely spaced phase-locked frequencies. The frequency or comb spacing is determined by the pulse repetition rate of the MLL.

The laser source 510 may, for example, comprise a ring laser that may be formed using a semiconductor optical amplifier or erbium doped fiber amplifier. The ring laser includes, for example, a laser cavity, a modulator, a wavelength division multiplexer, and a tap point for providing an output signal, which comprises optical pulses.

Referring to FIG. 5, the MLL produces as its output a stream of short optical pulses 512 in the time domain. The pulsed signal can also be shown to be equivalent to a comb of phase-locked continuous wave optical frequencies 514 equally spaced on a frequency grid determined by the laser repetition rate.

As an example, the present invention uses 8 or 16 equally spaced phase-locked laser lines confined to an 80 GHz window depending on the data rate for individual channels. This 80 GHz window is considered to comprise 8 or 16 frequency bins, each bin being phase encoded using a coder, to be described below, based on an ultrahigh resolution demultiplexer.

In comparison to prior art SPE that use the continuous broad spectrum of an ultrashort pulse source, the technique disclosed in the present invention has the advantage of confining the data-modulated MLL lines to their respective phase coded frequency bins and all frequency bins to a small tunable window. The narrower spectral extent of the coded signal also limits the impact of the transmission impairments such as dispersion and makes this system compatible with standard WDM optical networks.

The output signal 512 is provided to each of data modulators $520_{1-N}$. N tributaries or channels in the system provides data $522_{1-N}$ that is used to respectively modulate the pulse train or output signal 512. Data modulators $520_{1-N}$ operate to provide ON/OFF keying resulting in time-domain signal 524. In time domain signal 524, the pulses with a solid outline indicates a "1" symbol or bit and pulses with a faint outline represents a "0" symbol or bit, as previously discussed. The spectral content of such a signal is shown in frequency plot 526 in FIG. 5.

Each of the modulated optical pulse signals are then fed to respective spectral phase encoders $530_{1-N}$. Encoding consists of separating each frequency bin, shifting its phase, in this case by 0 or π, as prescribed by the choice of code, and recombining the frequency bins to produce the coded signal. When the relative phases of the frequencies are shifted, the set of frequencies is unaltered, but their recombination results in a different temporal pattern, e.g., a pulse shifted to a different part of the bit period, multiple pulses within the bit period, or noise-like distribution of optical power. Each OCDM code is desirably defined by a unique choice of phase shifts.

In accordance with the present invention, a set of Hadamard codes, which are orthogonal and binary, can be chosen as a coding scheme. This choice is desirable in that it can achieve relatively high spectral efficiency with minimal multi-channel interference (MCI). Specifically, this coding scheme offers orthogonality in the sense the MCI is zero at the time that the decoded signal is maximum. The number of orthogonal codes is equal to the number of frequency bins; hence, relatively high spectral efficiency is possible. Binary Hadamard codes are converted to phase codes by assigning to +1's and −1's phase shifts of 0 and π, respectively. To encode data, which contains a spread of frequencies, as opposed to the unmodulated pulse stream, which contains only the initial comb of frequencies produced by the MLL, it is preferable to define frequency bins around the center of frequencies. Encoding data then consists of applying the phase shift associated with a frequency to the entire bin. The output of the phase encoder is then a signal obtained by summing the phase-shifted frequency components of the modulated signal.

Applying any of these orthogonal codes (except for the case of Code 1, which leaves all phases unchanged) results in a temporal pattern which has zero optical power at the instant in time where the initial pulse would have had its maximum power. Although this choice of orthogonal codes implies synchronicity as a system requirement, since desynchronization will move unwanted optical power into the desired signal's time slot, careful code selection allows some relaxation of this requirement. For example, simulations indicate that for four tributaries transmitting at 2.5 Gb/s and using a suitably chosen set of four codes among a set of 15 Hadamard codes of length 16, up to 15 ps of relative delay can be tolerated with a power penalty within 1 dB at a BER of $10^{-9}$. Better resiliency to asynchronism may be achieved by using multiphase codes.

Phase coding of the individual spectral components requires a demultiplexer with sufficient resolution and path length stability and a means of shifting phases independently for each frequency. In an embodiment of the present invention, ring-resonator-based photonic integrated circuits are used to perform coding/decoding functions.

The use of ring-resonator-based circuits in an OCDMA system based on spectral-phase encoding of phase-locked lines of a MLL has been demonstrated by Anjali Agarwal et al. in "Fully Programmable Ring-Resonator-Based Integrated Photonic Circuit for Phase Coherent Applications," *IEEE J. of Lightwave Technology*, Vol. 24, No. 1, January 2006, pp. 77-87, the contents of which are incorporated by reference in the present application.

Below, the construction and characterization of ring-resonator-based photonic integrated circuits and how they can be used to perform coding/decoding functions are described.

Figure 6:
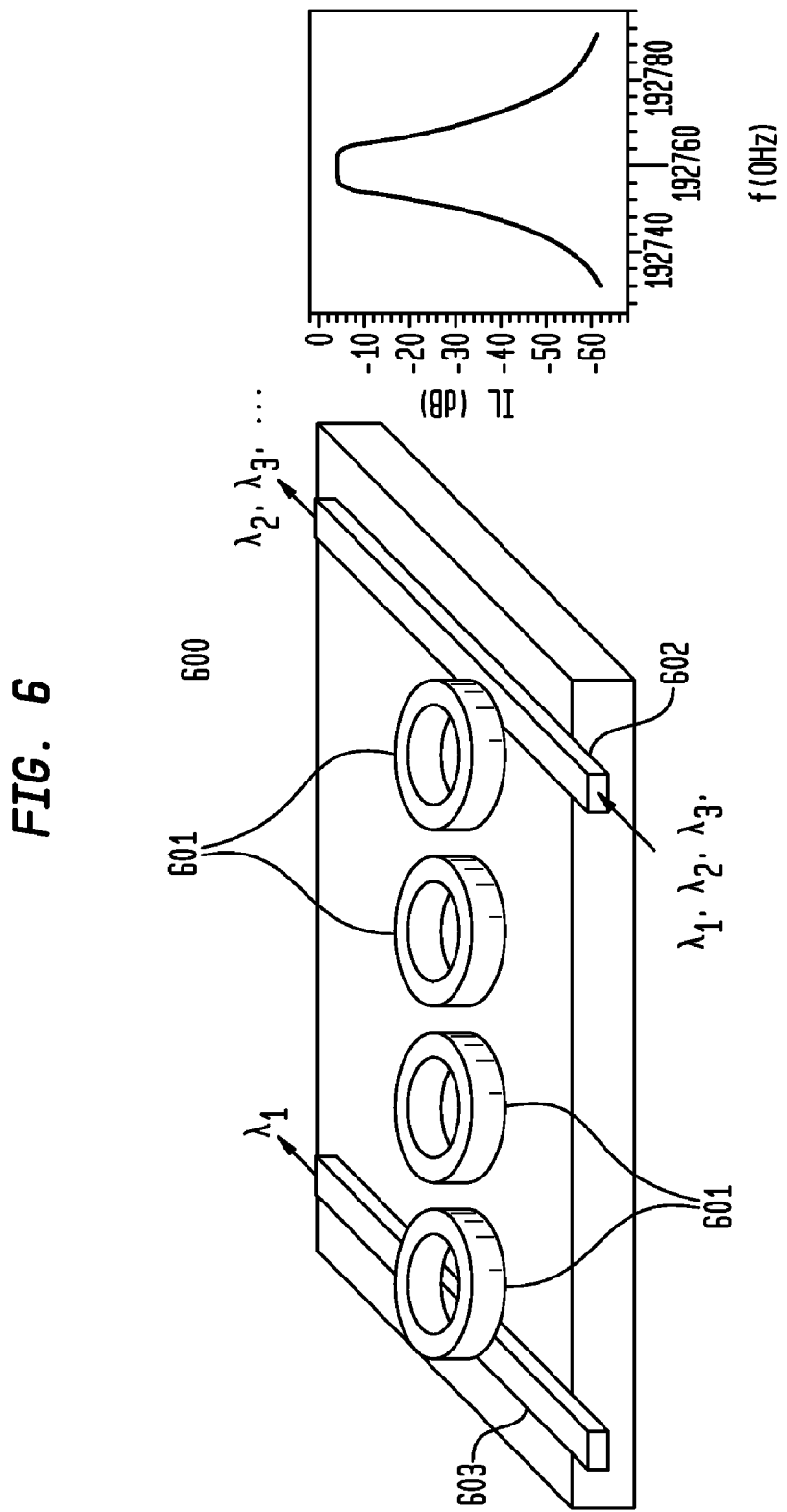
FIG. 6 illustrates a fourth-order micro-ring resonator filter.

As illustrated in FIG. 6, a fourth-order micro-ring resonator filter 600 is the basic building block for a coder/decoder. It comprises four micro-rings 601 that are vertically coupled to a pair of input 602 and output 603 bus waveguides. Vertical coupling allows for more precise control of the coupling strength than lateral coupling, since the vertical separation of the guides depends on the thickness of the intervening layer and is not determined by mask error, photolithography, or etching, all of which are more difficult to control with the required precision and reproducibility. In high-order micro-ring resonator (MRR) filters that are designed to have a maximally flat passband, the coupling between the bus waveguide 602, 603 and the ring 601 needs to be strong, whereas the coupling between adjacent rings 601 is designed to be weak. In order to achieve strong coupling between ring and bus in lateral configuration, the gap between the two would be sub-resolution, and therefore, subject to large random deviations. Vertical coupling allows the ring 601 and bus 602, 603 to come into close proximity without the need to etch an ultra-narrow coupling gap. Instead the coupling is determined by well-controlled material deposition. The rings 601 support resonant travelling wave modes and the resonant condition is determined by the circumference and effective index of the rings 601. At resonant wavelengths, optical power can be transferred completely from one bus waveguide 602 to the other 603 via the rings 601, as shown by $\lambda 1$ in FIG. 6, while off-resonant wavelengths $\lambda 2, \lambda 3, \ldots$ bypass the rings 601. The shape and bandwidth of the filter response is determined by the number of rings in the filter, the mutual coupling strength among the rings, and between the outer rings and the bus waveguides. By appropriately coupling multiple rings, the frequency response of the filters can be tailored to a desired response. As the number of coupled rings increase, the order of the filter increases, leading to a box-like filter response.

Figure 7:
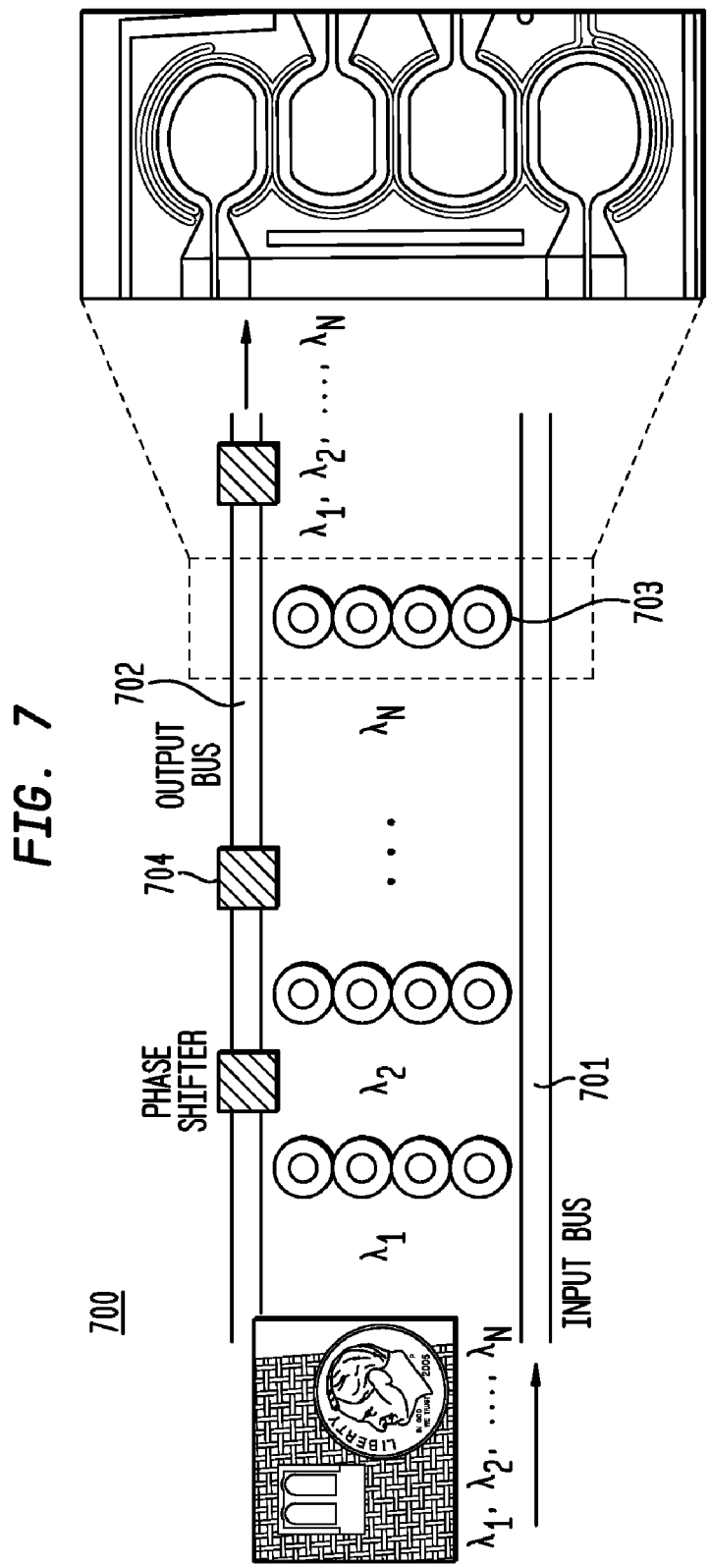
FIG. 7 is a schematic of the optical circuit, incorporating fourth-order micro-ring resonator filters.

FIG. 7 illustrates an exemplary coder/decoder circuit 700. The coder circuit 700 consists of a common input bus 701 and a common output bus 702, with fourth-order micro-ring resonators serving as wavelength-selective cross connects between the two. A fourth-order filter cell 703 occupies an on-chip area of $100 \times 400$ µm, allowing a large number of filter cells on a chip (64 filter cells on a $17 \times 17$ mm chip). Each filter 703 is independently tunable in wavelength and each passband represents a frequency bin. An independent heater is placed over each of the four rings and can be differentially adjusted to fine tune the optical line shape.

The relative phase shift between two adjacent frequency bins is controlled by a separate thermo-optic phase heater 704, shown in hatch marks in FIG. 7, and can be continuously varied between 0 and π. Hence, the micro-rings 703 provide the wavelength selectivity, and the thereto-optic heater 704 is used to control the relative phase of individual wavelengths.

Due to the symmetry of the above-described configuration, the optical path lengths from the input to the output are the same for all wavelengths, and hence, the original phase relationships are maintained for all wavelengths when the phase heaters are not activated.

The three necessary functions, frequency demultiplexing, phase shifting, and recombining the phase-shifted frequencies, are all accomplished in the above-described single integrated device.

Figure 8:
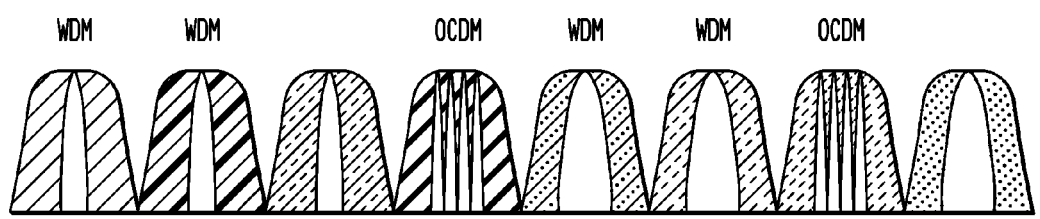
FIG. 8 shows a sketch of compatibility of an OCDM system with existing WDM networks. The second and fifth window from the right carry independent groups of OCDM signals.

Referring back to FIG. 5, the encoded N tributary or channel signals are then combined prior to being passed through phase scrambler 540 and being transmitted over the fiber link and through the network. The network can comprise a WDM network that allows the signals of the system 500 to be transported transparently to the other signals that are normally carried by the WDM network. In that regard, the system 500 advantageously uses a relatively small and tunable window, which is compatible with WDM systems that are currently deployed. FIG. 8 illustratively depicts how an OCDM system in accordance with the various aspects of the present invention may be overlaid on such a network. Note, however, any other optical network may be used in accordance with this aspect of the present invention if a tunable source is used. As FIG. 8 shows, the OCDM signals may be multiplexed into the WDM channel.

After the scrambled signals traverse the network, they are descrambled by descrambler 550 and split and provided to a plurality of matching decoders $560_{1 \ldots N}$. In particular, decoding may be accomplished by using a matched, complementary code; for the binary codes used here, the code is its own complement and consequently, the coder and decoder are identical. The decoded signal has the pulses restored to their original position within the bit period and restores the original pulse shape. Decoding using an incorrect decoder results in a temporal pattern that again has zero optical power at the center of the bit period and the majority of the energy for that pulse is pushed outside the time interval where the desired pulse lies.

Implementation of Photonic Layer Security

Figure 9:
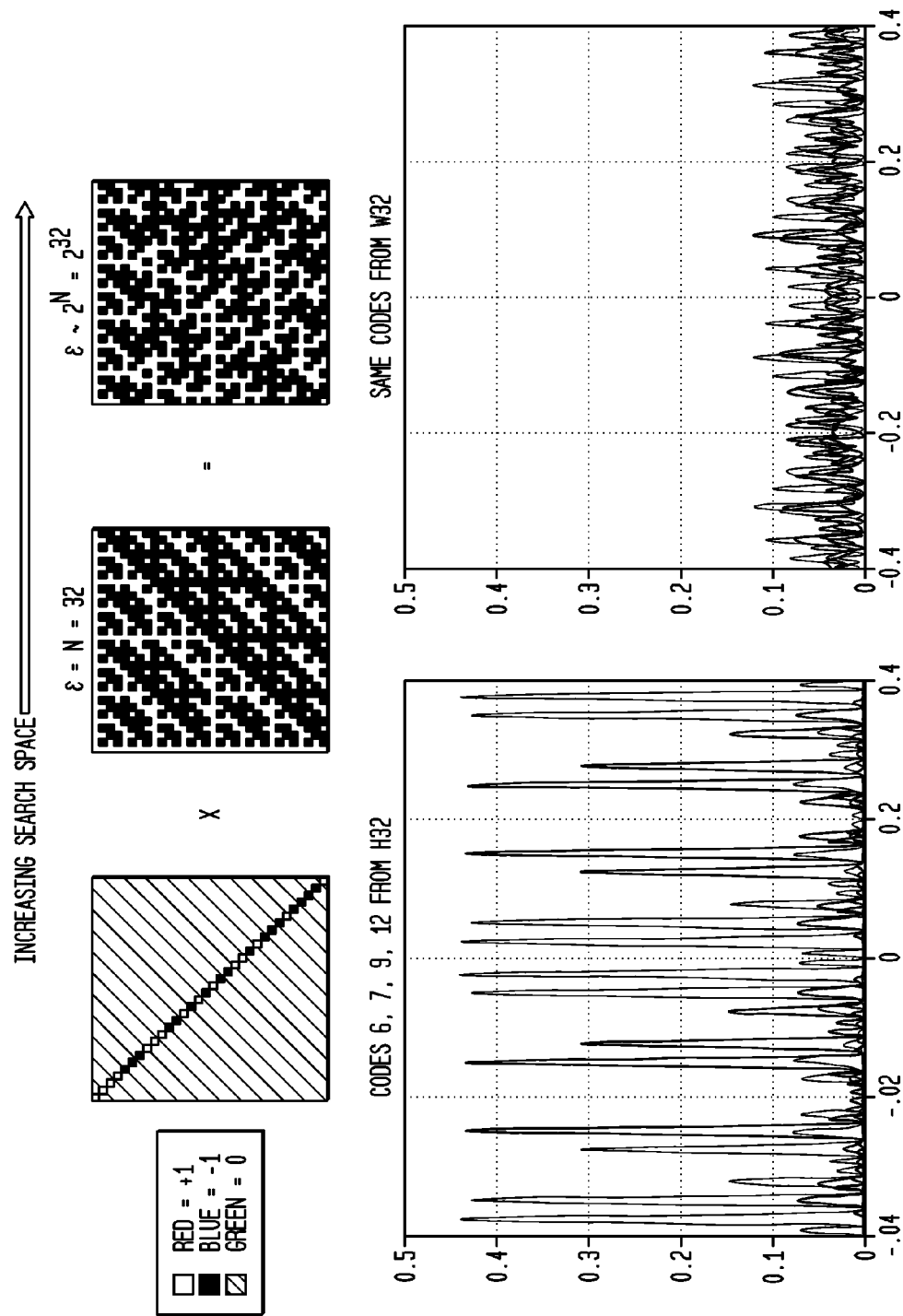
FIG. 9 illustrates the effect of scrambling on four Hadamard-32 signals. Each panel is the simulated temporal intensity variation for two bit periods as might be seen by an eavesdropper.

Referring to FIGS. 5, 9 and 10, implementation of OCDM-based photonic layer security (PLS) in accordance with an embodiment of the present invention is described below.

As stated above, since orthogonal codes are used, the maximum number of simultaneous tributaries or channels is equal to the number of frequency bins. For Hadamard codes of order N of ($H_N$) the number of possible orthogonal codes states so generated is N. An eavesdropper equipped with an adjustable decoder would have to guess only N possible code settings in order to tune in on any given tributary.

To increase the search space available to an eavesdropper with intentional malicious attacks, the present embodiment includes a phase scrambling methodology.

An orthogonal matrix $W_N$ can be generated from $H_N$ by premultiplying a diagonal or monomial matrix $D_N$ of order N with all of the on-diagonal elements being arbitrarily chosen phase shifts.

In other words, when random phase settings corresponding to the scrambling code are imposed on all the conventional Hadamard codes, a new set of N distinct orthogonal codes is produced, referred to here as the modified Hadamard codes. FIG. 9 illustrates the effect of scrambling on four Hadamard-32 signals. Each panel is the simulated temporal intensity variation for two bit periods as might be seen by an eavesdropper. The left panel shows the result of encoding with the original Hadamard-32 codes 6, 7, 9 and 12. The spiky nature of the patterns and their discrete appearance in the time domain would appear to render the codes vulnerable to detection by an eavesdropper. However, using the corresponding set of scrambled Hadamard-32 results in the substantially different time-dependent signal shown in the right panel of FIG. 9. The modified Hadamard-32 has been created by a scrambler using random 0 and π phase shifts for each element. For this binary choice of phase setting and diagonal matrix, the search space is increased from e=32 to $\epsilon = 2^{32}$, assuming all 32 codes are present. Note that not only has the peak amplitude of the variation been suppressed, but the energy in a bit is now spread throughout the bit period.

Using monomial matrix increases the search space further to $\epsilon = 32! \times 2^{32}$. More importantly, in addition to shared phase scrambling, the frequency shuffling decouples the correlation between the attempted guess of the key unless about 75% of the key has correctly been identified. This procedure ensures that exhaustive search attack is practically impossible. The application of monomial matrix to OCDM-based encryption is described by G. Di Crescenzo et al. in "On the Security of OCDM-based Encryption Against Key-Search Attacks," presented at Summer 2009 IEEE/LEOS Summer Topical Meeting on Optical Code Division Multiple Access, July 2009, Newport Beach, Calif., the contents of which are incorporated by reference in the present application.

It is important to recognize that the random diagonal matrix $D_N$ can be implemented as a separate encoder similar to the same sort used to apply Hadamard codes to the MLL signal. This means one can physically separate the Hadamard coding stages used for directing communication between end users and the diagonal matrix scrambling stages in a network. Since it would be desirable to change the scrambling code with some regularity, the scrambling coders should be dynamically adjustable in synchrony and there is therefore some advantage to sharing these units to keep their number small.

As a result, increased capacity has been achieved through inverse multiplexing of the tributaries of a high data rate signal and the improved security has been created through phase scrambling.

This degree of signal obscuration coupled with the potentially large number of possible scrambler states and the ability to dynamically change the scrambler code setting at will all contribute to the obscurity of the composite signal. The large code space makes eavesdropping by exhaustive search for the scramble key a practical impossibility in a brute force attack.

Implementation of Multi-Channel Interference (MCI) Rejection

Figure 11:
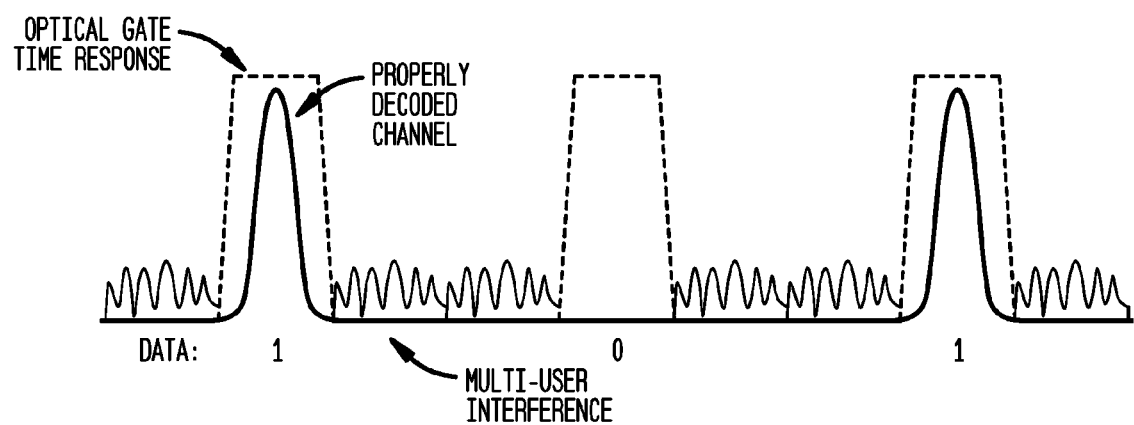
FIG. 11 illustrates optical time gating for multi-channel interference (MCI) rejection.

Referring to FIGS. 5 and 11, implementation of multi-channel interference (MCI) rejection in accordance with an aspect of the present invention is described below.

MCI noise from undesired tributaries or channels may remain even after the signals have passed through the matched OCDM decoder. In addition, since the optical signal energy present in both the decoded and undesired channels are similar in magnitude, both will appear essentially identical from the perspective of a typical photoreceiver that is band-limited to the data bit rate, preventing the desired signal from being recovered correctly. Therefore, further processing techniques are necessary in order to eliminate the interference.

Given the bandwidth requirements of an OCDM system, which is typically on the order of many tens or even hundreds of GHz, the removal of interference performed in the electrical domain is impractical due to the need for ultrafast electronics. As a result, MCI rejection can be performed in the optical domain. One category of optical processing technique for MCI rejection is optical time gating.

Application of optical time gating to extract the decoded OCDM signal is illustrated in FIG. 11. Through the proper selection of an appropriate code set for a synchronous coherent OCDM system, it is possible to design the system such that the multi-channel interference energy falls outside a time interval where the properly decoded signal pulses reside. Therefore, by optically gating the composite signal in order to provide low loss within the desired time window while at the same time provide for high extinction outside that window, the properly decoded signal bit stream can be extracted.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical system for transporting data, comprising
   a source for generating a sequence of optical pulses each optical pulse comprising a plurality of spectral lines uniformly spaced in frequency with fixed absolute frequency and relative phase;
   a set of data modulators each associated with a tributary/channel and operable to modulate the sequence of pulses using tributary/channel data to produce a modulated data signal;
   a set of encoders imparting a plurality of orthogonal codes, each of the plurality of orthogonal codes being associated with one of the data modulators to spectrally encode the modulated data signal to produce an encoded data signal;
   an optical combiner for bit-synchronously combining the encoded data signals into a composite transport data signal wherein each tributary/channel shares the same spectral bandwidth during transmission;
   a shared spectral phase scrambler for phase scrambling the composite transport data signal using a shared scramble code as an encryption key to generate the encrypted signal;
   a shared spectral phase descrambler for descrambling the encrypted signal using a shared descramble code as a key to generate a descrambled data signal, the shared descramble code being a compliment of the shared scramble code; and
   a set of decoders each of which is a conjugate match to one of the encoders, for spectrally decoding a specified encoded data signal to produce a set of decoded data signals.

2. The optical system of claim 1, wherein the source for generating the sequence of optical pulses comprises a mode locked laser wherein each of the plurality of spectral lines is approximately equal in amplitude and phase locked.

3. The optical system of claim 2, wherein the encoder comprises a spectral phase encoder that applies a phase shift defined by a code applied to each of the plurality of spectral lines.

4. The optical system of claim 3, wherein the code is chosen from a set of two or more mutually orthogonal codes.

5. The optical system of claim 4, wherein the set of two or more mutually orthogonal codes comprises a set of Hadamard codes.

6. The optical system of claim 1, wherein the same spectral bandwidth for a group of tributaries/channels is limited to a transparent window in a WDM network.

7. The optical system of claim 1, further comprising an optical time gate coupled to the output of the matching decoder and operable to temporally extract data signal from the decoded signals.

8. The optical system of claim 1, wherein the shared spectral phase scrambler applies a random phase setting to the plurality of orthogonal codes, the resulting shared scramble code being used by the scrambler for scrambling the composite transport data signal.

9. The optical system of claim 1, wherein the set of encoders and the set of decoders are comprised of at least one micro-ring resonator.

10. An optical system for transporting data, comprising:
- a source for generating a sequence of optical pulses each optical pulse comprising a plurality of spectral lines uniformly spaced in frequency with fixed absolute frequency and relative phase;
- a set of data modulators each associated with a tributary/channel and operable to modulate the sequence of pulses using tributary/channel data to produced a modulated data signal;
- a set of encoders imparting a plurality of orthogonal codes, each of the plurality of orthogonal codes being associated with one of the data modulators to spectrally encode the modulated data signal to produce an encoded data signal;
- an optical combiner for bit-synchronously combining the encoded data signals into a composite transport data signal wherein each tributary/channel shares the same spectral bandwidth during transmission;
- a shared spectral phase and frequency scrambler for phase and frequency scrambling the composite transport data signal using a shared scramble code as an encryption key to generate the encrypted signal;
- a shared spectral phase and frequency descrambler using monomial matrix for descrambling the encrypted signal using a shared descramble code as a key to generate a descrambled data signal, the shared descramble code being a compliment of the shared scramble code; and
- a set of decoders each of which is a conjugate match to one of the encoders, for spectrally decoding a specified encoded data signal to produce a set of decoded data signals.

* * * * *

UNITED STATES PATENT AND TRADEMARK OFFICE
CERTIFICATE OF CORRECTION

PATENT NO. : 8,290,371 B2  
APPLICATION NO. : 12/563706  
DATED : October 16, 2012  
INVENTOR(S) : Etemad et al.

Page 1 of 1

It is certified that error appears in the above-identified patent and that said Letters Patent is hereby corrected as shown below:

In the Specification

In Column 5, Line 35, delete "deter mined" and insert -- determined --, therefor.

In the Claims

In Column 10, Line 6, in Claim 1, delete "comprising" and insert -- comprising: --, therefor.

Signed and Sealed this
Eleventh Day of November, 2014

Michelle K. Lee
*Deputy Director of the United States Patent and Trademark Office*